Figure 5:
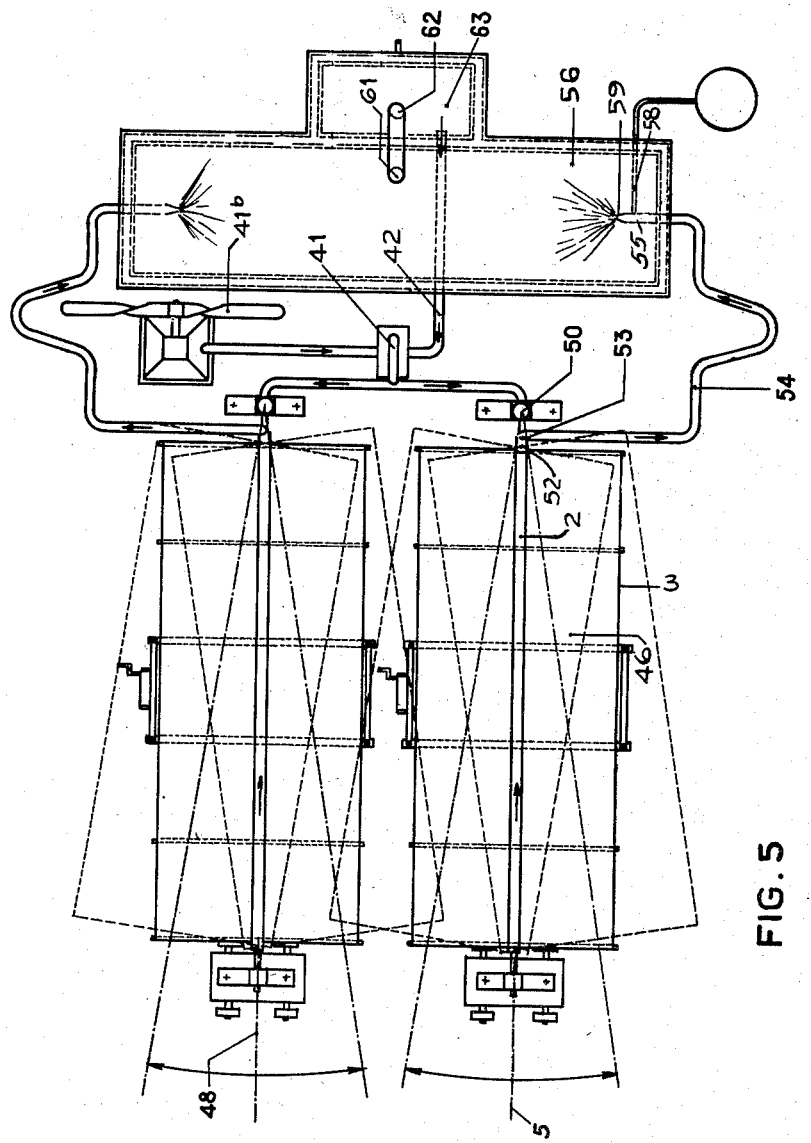

Aug. 20, 1957  H. COANDA ET AL  2,803,591
APPARATUS FOR PURIFICATION OF UNDRINKABLE WATER
Filed April 27, 1954  4 Sheets-Sheet 1
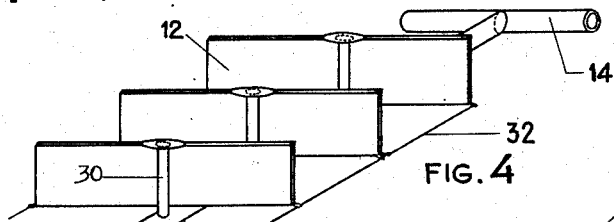
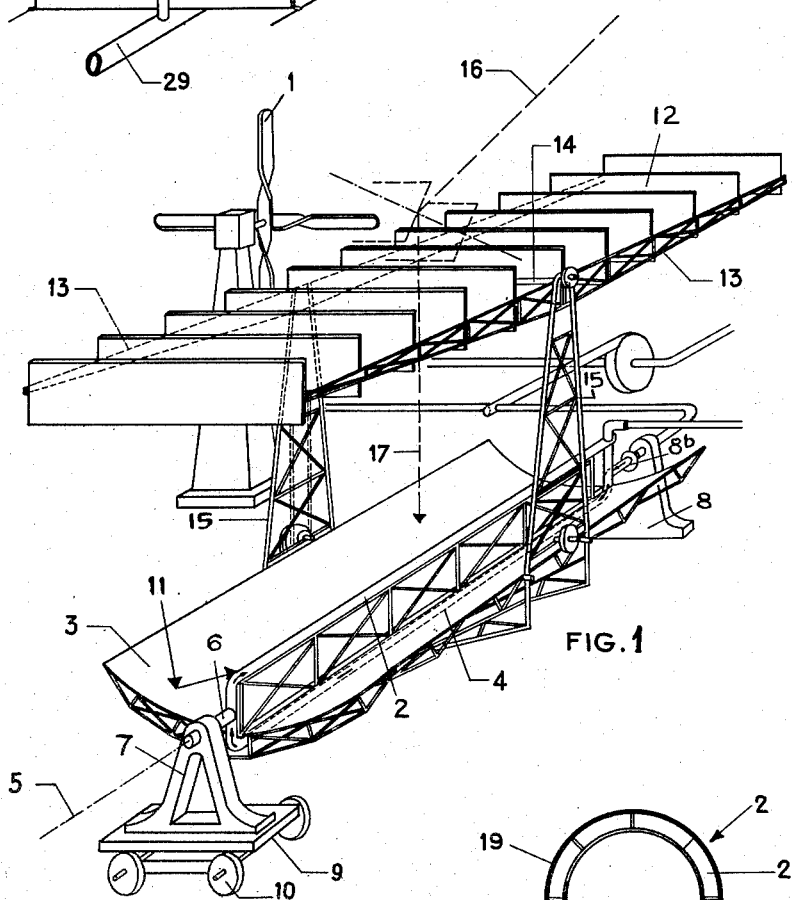
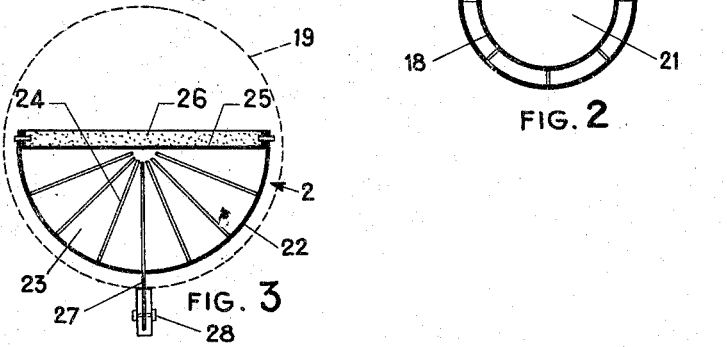

United States Patent Office 2,803,591
Patented Aug. 20, 1957

2,803,591
APPARATUS FOR PURIFICATION OF UNDRINKABLE WATER

Henri Coanda and Marguerite Coanda, née Lecca, Paris, France

Application April 27, 1954, Serial No. 425,978

Claims priority, application France April 29, 1953

6 Claims. (Cl. 202—234)

The present invention concerns the purification of undrinkable water and, if desired, the recovery of mineral elements from the undrinkable water to be purified, such as sea water or brackish water.

According to the invention, the undrinkable water to be treated is sprayed into a closed and well insulated chamber containing relatively dry air at a high temperature so that hot air is enriched with water vapour almost to saturation point, the said saturated and still relatively hot air is withdrawn from the chamber and is cooled to lower its saturation point to a value at which the quantity of water in the air, in excess of that permitted for the new saturation point, is condensed, the condensed water is collected as drinking water and the residual solution containing a concentration of mineral elements left over from the water introduced to the hot air chamber is collected for a possible subsequent recovery of the mineral products therein.

It is therefore an object of the invention to provide a simple and cheap process of purifying undrinkable water e. g. sea water.

The present invention also includes within its scope apparatus for carrying out the above process and according to a particular feature of the invention the apparatus has particular advantages when intended for use in countries having a considerable amount of sunshine and where solid or liquid fuel is difficult to obtain or costly.

It is therefore an object of the invention to provide an apparatus for the purification of undrinkable water without using any solid or liquid fuel comprising an assembly of mirrors to concentrate the sun's rays to provide the heat for raising the temperature of the air which is to be fed to said insulated chamber. According to a feature of the invention these mirrors are so orientated that the sun's rays are concentrated as effectively as possible on the air duct leading to the dry-air chamber. To this end it is an advantage to employ trough-like mirrors of parabolic section, the air ducts being elongated and extending along the focal axis of the mirror.

A further feature of the invention is directed to adjusting the mirrors to take account of the movement of the sun across the sky so that at all times the most effective use is made of the sun's rays and also for initially setting up the mirrors to take account of the position of the sun in the sky at different times of the year.

In one embodiment of the invention the air, in which the undrinkable water is pulverized, is heated in at least one tubular element disposed along the focal axis of a trough-like mirror of parabolic section, said parabolic mirror being able to swing around a horizontal axis parallel to said focal axis and to rotate around a vertical axis. Above each parabolic mirror is disposed a series of plane mirrors arranged side by side and parallel to one another, said series of plane mirrors being rotatable as a whole in order to form a variable angle to the vertical.

The aforesaid and other objects, features and advantages of the invention will be more easily and fully understood from the illustration of one embodiment of an apparatus for purifying undrinkable water according to the invention, being understood that the invention is not restricted to the details of the illustrated and described embodiment but that it is susceptible to modifications and adaptations.

Figure 6:
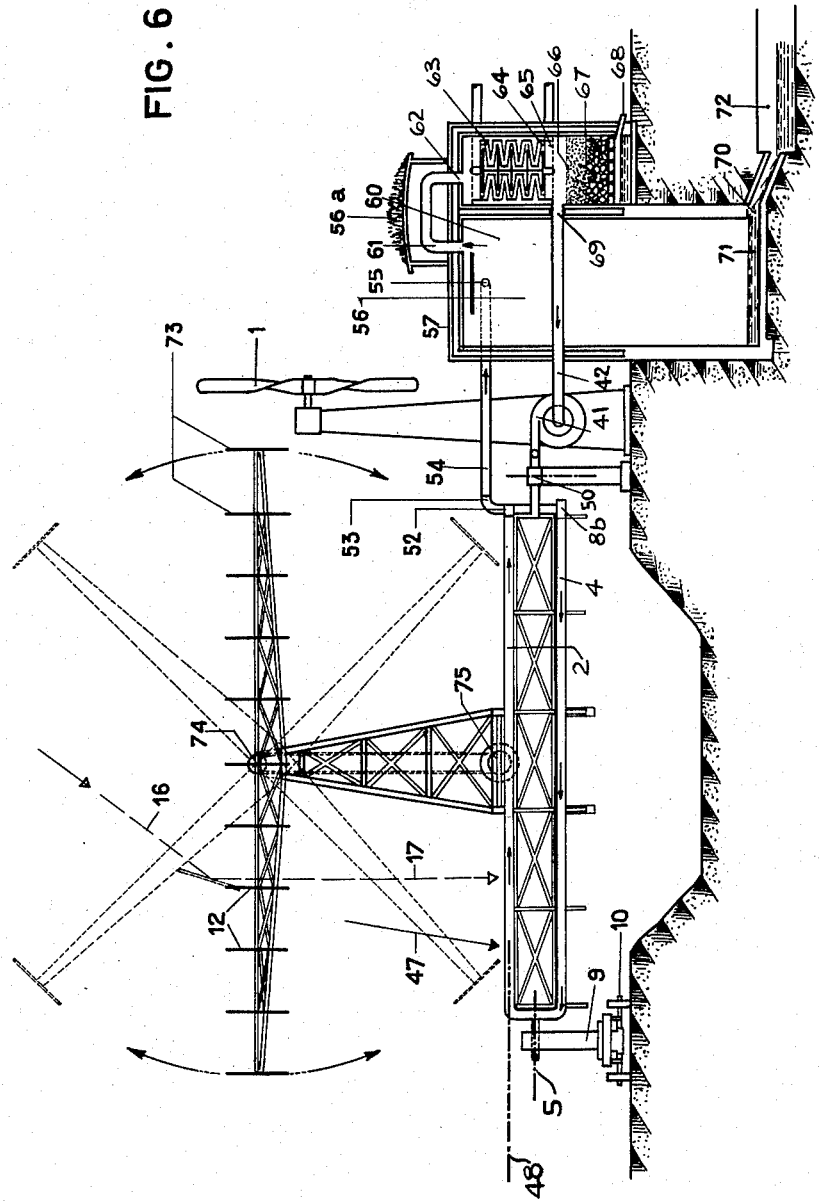
Figure 7:
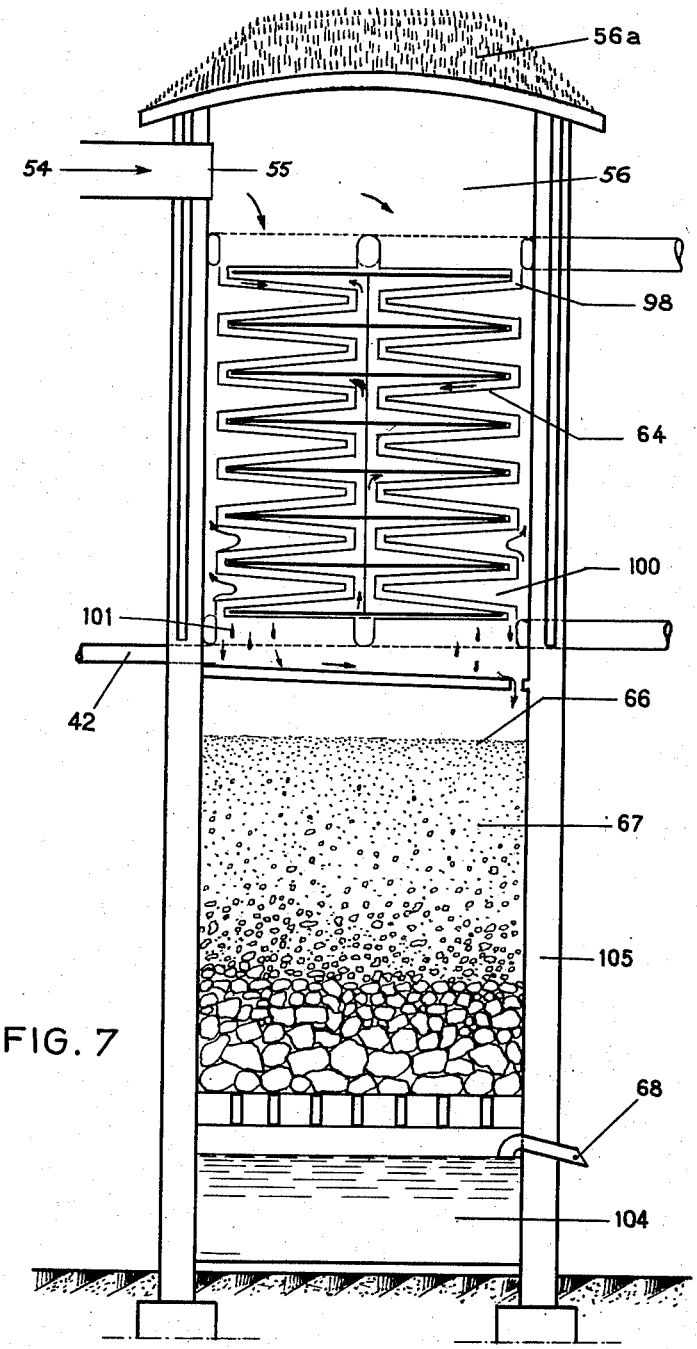

In the attached drawings:

Figure 1 is a view in isometric projection of the apparatus,

Figure 2 is a transverse section of a tubular air duct forming part of the apparatus of Figure 1, Figure 3 is an alternative construction of air duct, Figure 4 is a view in isometric projection of an arrangement of mirrors for directing the sun's rays in a required direction, Figure 5 is a plan view of the apparatus as a whole, Figure 6 is a side view, partly in section, of the apparatus shown in Figure 5, and Figure 7 is a section, to a larger size, of part of the apparatus.

Referring to the drawings: the air to be heated by the sun's rays is circulated through the apparatus by a fan 41 driven by a windmill 1. The air duct 2 receives air from the fan, as later described and it is arranged that as the air passes through the air duct it is heated by the sun's rays for which purpose the duct, which is elongated, extends along the focal axis of a trough-like mirror 3 of parabolic section. Air is supplied to the air duct 2 through an inlet pipe 4 and it is arranged that the assembly comprising the members 2 and 4 rotates about a horizontal axis 5 parallel to the air duct 2 and the focal axis. To permit such adjustment the shaft 6 is connected to the members 2 and 4 and is mounted in bearings 7 and 8 of which the bearing 7 is mounted on a carriage 9 having wheels 10 whereby the axis 5 may be angularly adjusted to a limited extent, an articulated joint 8b permitting rotation of the mirror-air duct assembly relatively to the fixed bearing 8. The parabolic mirror 3 is suitably supported from the shaft 6 e. g. being secured to the supply pipe 4.

It will be appreciated therefore that the parabolic mirror 3 is adjustable in a horizontal plane by movement of the carriage 9 to occupy different inclinations by rotation about the axis 5.

The two movements of the parabolic mirror referred to in the preceding paragraph are not sufficient to enable the mirror to concentrate the sun's rays on the air duct 2 for the different positions of the sun throughout the hours of the day and throughout all the periods of the year and this is particularly so when the carriage 9, as indicated above, has a limited movement and also where there is provided several parabolic mirrors disposed side by side each to concentrate the sun's rays on an associated air duct 2.

In order that the sun's rays may be directed through the year as effectively as possible on to the air duct there is disposed above each parabolic mirror a series of plane mirrors 12 arranged side by side and parallel to one another, the mirrors being secured to a pair of spaced parallel lattice beams 13. The beams are connected together by a shaft 14 which rotates in bearings carried by pylons 15 and it is arranged that the mirrors 12 remain at all times parallel to one another and form a variable angle with respect to the vertical. As evident in Figure 1 the series of mirrors 12 are normal and are spaced along the focal axis of the parabolic mirror and are arranged to direct the sun's rays on to the parabolic mirror. In Figure 1 the sun's direct rays are indicated at 16. The reflected ray from a mirror 12 on to the parabolic mirror is indicated at 17. With this arrangement the sun's rays may be concentrated on to the air duct even when the sun is low on the horizon.

Adjustment of the mirrors 12 and of the parabolic mirror 3 may be manually effected or such adjustment may be performed automatically by employing, for example, photoelectric cells responsive to the action of the sun's rays or by any other means.

Figure 2 is a transverse section of an air duct 2 comprising a black tube 18 and a transparent covering 19, the air circulating in the spaces 20 between the tube 18 and the covering 19 becoming heated by the sun's rays.

In the arrangement of Figure 1 the air duct 2 and the supply pipe 4 are arranged one in front of and one behind the parabolic mirror. Alternatively, however, they may be arranged side by side and extending along the focal axis of the parabola. Again, according to another alternative the space 21 within the tube 18 may constitute the air supply pipe. According to yet a further alternative the space 21 may constitute the air duct and the space 20 the air supply pipe.

Figure 3 illustrates an alternative arrangement of air duct 2 comprising a semi-circular trough 22 having inwardly directed radial vanes 24, the trough being closed by a lid 25 incorporating insulating material 26. The vanes 24 increase the heat exchange surface for the air circulating along the spaces 23. The whole is disposed in a transparent covering 19.

The trough 22 will expand when heated and to allow for this the trough is supported by a blade 27 slidably supported in a member 28.

A control for adjusting the series of mirrors 12 each about an axis 30 is illustrated in Figure 4. Each mirror is supported by a pin for adjustment about the axis 30, the pins being carried by a tubular beam 29 which extends outwardly from the shaft 14. The edges of the series of mirrors are connected to a rod or cable 32 extending along a lattice beam 13 and it is to be understood that a rod or cable 32 is provided for each beam 13. Adjustment of the rods or cables 32 will simultaneously rotate all the mirrors 12 of the series each about the axis 30.

Figures 5 and 6 illustrate the entire apparatus in accordance with the present invention and it will be observed that the apparatus comprises a pair of parabolic mirrors 3 arranged side by side and constructed as described with reference to Figure 1. The fan 41 draws air along duct 42 and delivers it to the air ducts 2 as described above. As shown in Figure 5 one of the air ducts is on the focal axis 5 and the other on the focal axis 48 of the second parabolic mirror. The parabolic mirrors heat the air circulating in the air ducts 2 as described above.

It may be arranged that each parabolic mirror 3 comprises a plurality of relatively small rectangular mirrors adjustably secured side by side on a frame or backing such as a fabric.

Mounted above each of the troughs is a series of mirrors 12 both faces of which are reflective and which are adapted to turn about shaft 74 by means of a mechanism 75. Rotation of the series of mirrors about the shaft 74 permits the sun's rays to be concentrated on the part of parabolic mirrors 3 as described above. In Figure 6 alternative positions of the mirrors 12 are indicated in dotted lines as in Figure 1.

The air is delivered to the air inlet pipe through an articulated joint 8b which is adjustable about vertical axis 50. It is obviously also necessary that a corresponding articulated joint be provided for the air duct 2 and this is illustrated in Figure 5 at 52.

The heated air from the air ducts 2 is delivered to nozzles 55 from which it is discharged into the dry-air chamber 56. The chamber 56 is closed and is insulated by an outer covering 57. The water to be purified is delivered to the chamber 56 through a pipe 58 and discharged into the chamber through a nozzle 59, for example, being finely atomized by part of the hot air delivered from the air duct 2 to the nozzle 54.

It is preferred, as shown in Figure 6, that the chamber 56 be partly sunk into the ground and that the upper part of the chamber 56 be insulated by glass wool 56a, for example.

The hot air from the ducts 2 absorbs a part of the water delivered to the chamber 56, at 58, and becomes substantially saturated with water vapour. The saturated air leaves the chamber 56 by a conduit 61 and is delivered at 62 to a cooling installation 63 (see particularly Figure 7). The installation comprises a radiator 64 on which there is deposited the moisture resulting from a lowering of the temperature of the air to below the dew point, such water collecting in the lower part of the installation at 66 and passing through a bed 67 of sand and stones for final discharge at 68 as drinking water. The air which passes through the cooling installation leaves through the pipe 42 and is drawn into the fan 41 for return to the air ducts 2, the air passing in a substantially closed cycle.

The water delivered to the chamber 56 and which is not carried off by the hot air to the cooling installation 63 collects in the lower part of the chamber, as at 71, and flows away through a channel 70 for collection at 72 for any desired purpose, for example in order subsequently to recover the mineral elements in the water. Such recovery may, for example, be performed by supplying the water collected at 72 to a saucer or tank where it is evaporated by heat from the sun, the water vapour being collected separately.

Referring again to Figure 7: it will be observed that the air from the chamber 56 circulates through a narrow labyrinth 98 and passes in intimate contact over the walls of the radiator 64 while cooling water passes upwardly through the radiator in the space 100. The water from the radiator produced by condensation of the saturated air from the chamber 56 collects at 101 and trickles through the bed of sand and stones 67, the latter being supported in a casing 105 which also serves as a reservoir for the purified water. A small proportion of sea water may be added to the purified water to add thereto a small amount of minerals so that it is more palatable.

The temperature of the cooling water is raised by heat-exchange; it is therefore convenient to use said heated cooling water for pulverization through nozzle 59. In that case the water to be purified travels first through space 100 where it is heated, then through pipe 58 and nozzle 59 which pulverizes it in chamber 56.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

What we claim is:

1. Apparatus for the purification of non-potable water comprising, in combination, an installation for heating a circulating mass of air, said installation comprising at least one tubular element through which said air circulates and at least one trough-like mirror of parabolic section having the focal axis thereof horizontally disposed, with said tubular element disposed along said focal axis of said mirror, said mirror with its associated tubular element being mounted for rocking movement about a horizontal axis disposed in the plane of symmetry of said mirror, and also being mounted to rotate about a vertical axis, a frame mounted for movement with said trough-like mirror, an assembly of tiltable parallel plane mirrors supported by said frame above said trough-like mirror at a predetermined distance therefrom with said assembly extending substantially throughout the length of said trough-like mirror, and means for tilting said assembly of parallel plane mirrors as a unit for directing the rays of the sun received by said plane mirrors onto said trough-like mirror.

2. An installation for heating by means of the sun's rays a circulating mass of air for use in the purification of non-potable water, said installation comprising, in combination, at least one trough-like mirror of parabolic section having the focal axis thereof horizontally disposed, at least one tubular element through which said air circulates, said tubular element being disposed along said focal axis of said trough-like mirror and said mirror with its associated tubular element being mounted for rocking movement about a horizontal axis disposed in the plane of symmetry of said trough-like mirror and for rotation about a vertical axis, a frame mounted for movement with said trough-like mirror about said vertical axis, an assembly of tiltable parallel plane mirrors supported by said frame above said trough-like mirror at a predetermined distance therefrom with said assembly extending substantially throughout the length of said trough-like mirror, and means for tilting said assembly of parallel plane mirrors as a unit for directing the rays of the sun received by said plane mirrors onto said trough-like mirror.

3. An apparatus as defined in claim 1, wherein said tubular element comprises an exterior transparent tube and an interior hollow element.

4. An apparatus as defined in claim 2, wherein said tubular element comprises an exterior transparent tube and an interior black half-tube having internal vanes and being insulated at its upper portion.

5. An apparatus as defined in claim 2, wherein said tubular element is secured to a rigid frame by elements which permit said tube to undergo axial thermal-expansion.

6. An installation as defined in claim 2, wherein said tubular element comprises an exterior transparent tube and an interior black semi-circular conduit having internal vanes and being insulated at its upper portion.

References Cited in the file of this patent

UNITED STATES PATENTS

| 1,493,756 | La Bour | May 13, 1924 |
| 2,133,649 | Abbot | Oct. 18, 1938 |
| 2,368,665 | Kohman | Feb. 6, 1945 |
| 2,490,659 | Snyder | Dec. 6, 1949 |

FOREIGN PATENTS

| 454,558 | Great Britain | Sept. 28, 1936 |

OTHER REFERENCES

"Demineralization of Saline Water With Solar Energy," by George O. G. Lof (Saline Water Conversion Program, Research and Development Progress Report No. 4), U. S. Dept. of the Interior, August 1954, pages 18–28 and Figs. 1–20.